E. KINZEL.
IMPLEMENT.
APPLICATION FILED MAR. 9, 1916.
1,188,183.
Patented June 20, 1916.
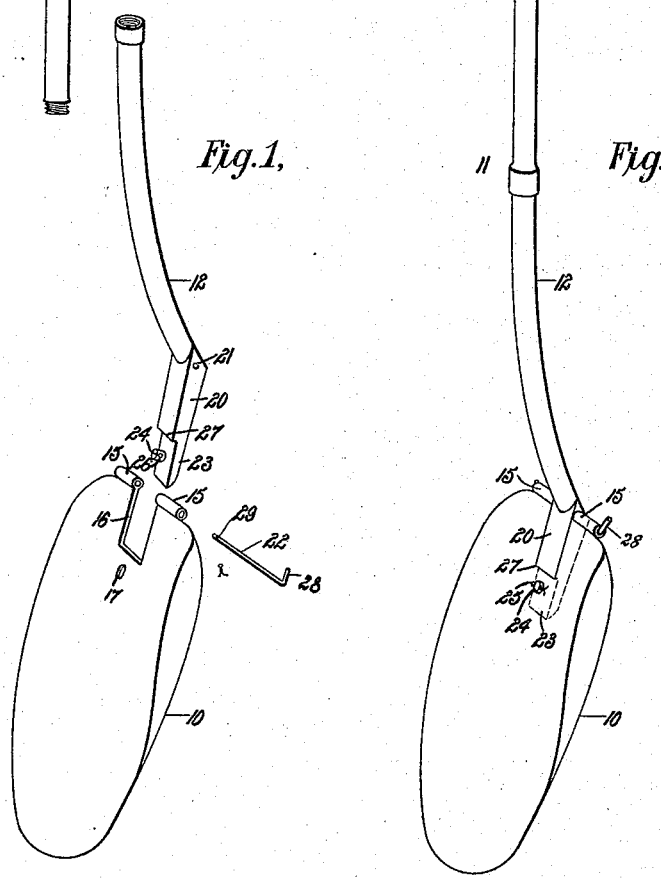

UNITED STATES PATENT OFFICE.

EDWARD KINZEL, OF ALBANY, NEW YORK.

IMPLEMENT.

1,188,183.

Specification of Letters Patent.

Patented June 20, 1916.

Application filed March 9, 1916. Serial No. 83,090.

*To all whom it may concern:*

Be it known that I, EDWARD KINZEL, a citizen of the United States, and a resident of Albany, in the county of Albany and State of New York, have invented a new and Improved Implement, of which the following is a full, clear, and exact description.

The object of the invention is to provide a new and improved implement, such as a shovel, spade or the like, arranged to permit of quickly and securely assembling and fastening together the handle and blade without the use of special tools or to disassemble the parts with a view to form the same into a small bundle for convenient carrying in a knapsack, bag, grip or other similar receptacle. In order to produce the desired result, use is made of a blade and a separable handle pivotally connected with each other, and locking means for locking the said handle to the said blade.

A practical embodiment of the invention is represented in the accompanying drawings forming a part of this specification, in which similar characters of reference indicate corresponding parts in all the views.

Figure 1 is a perspective view of the shovel with the parts in disassembled position; Fig. 2 is a like view of the shovel with the parts assembled; and Fig. 3 is a perspective view of the blade and handle in folded position.

The implement in its general construction consists of a blade or scoop 10 and a handle 11, which latter is preferably made in two parts 12 and 13 screwed together and of which the outer part 13 is provided with a hand hold 14. The blade 10 is provided at its base with spaced eyes 15 in transverse alinement with each other, and this end of the blade 10 is provided with a cut-out portion 16, the sides of which are flush with the inner ends of the eyes 15. An aperture 17 is formed in the blade 10 adjacent the bottom of the cut-out portion 16. The handle section 12 is provided with a forwardly extending angular arm 20 fitting into the cut-out portion 16, as plainly shown in Fig. 2, and the said handle section 12 is provided at the junction with the arm 20 with a transverse aperture 21 in alinement with the opening in the eyes 15. A pintle 22 is adapted to pass through the eyes 15 and the aperture 21 to pivotally connect the handle section 12 with the blade 10. The arm 20 is provided at its forward end with an extension 23 underlying the blade 10 forward of the cut-out portion 16 and this extension 23 is provided with a pin or a lug 24 extending through the aperture 17 in the blade 10. A cotter pin 25 engages an aperture 26 in the pin or lug 24 and extends across the face of the blade 10 to securely lock the arm 20 in position on the blade 10. The extension 23 forms with the arm 20 a shoulder 27 adapted to abut against the bottom of the cut-out portion 16, the shoulder being of a depth corresponding approximately to the thickness of the blade 10 so that the face of the arm 20 is practically flush with the face of the blade 10 (see Fig. 2).

In order to hold the pintle 22 against accidentally dropping out of the eyes 15, one end of the pintle is provided with an upturned handle or arm 28 and the other end is provided with an aperture 29 for the passage of a cotter pin abutting against the outer end of the corresponding eye 15, thus locking the pintle 22 in place in the eyes 15 and the handle section 12.

It will be noticed that the several parts can be readily assembled without the use of any special tool, and the parts are securely locked in place so that the implement can be readily used for shoveling, digging or other similar purposes. When it is desired to disassemble the parts for forming the same into a small bundle for carrying or transportation purposes then the cotter pin 25 in the pin 24 is removed to allow of swinging the blade 10 onto the handle section 12, as plainly indicated in Fig. 3, so that the two parts take up very little room, it being understood that the outer handle section 13 is unscrewed from the handle section 12 to form part of the bundle. If desired, however, the blade 10 and the handle section 12 may also be disconnected from each other by withdrawing the cotter pin from the pintle 22 and then withdrawing the latter from the eyes 15 and the handle section 12 to detach the blade 10 from the handle section 12.

It will also be noticed that the implement shown and described is very simple and durable in construction and is very serviceable for the use of soldiers, linemen, trackmen, campers, civil and mining engineers, automobilists and other persons desiring to carry a shovel or a spade along, especially as the implement shown and described can be folded in a comparatively small bundle for convenient carrying in a knapsack, handbag, grip or other similar receptacle.

Having thus described my invention, I claim as new and desire to secure by Letters Patent:

1. A shovel, spade or similar implement, comprising a blade and a separable handle pivotally connected with each other, the blade having a cut-out portion at the base, the handle having a forwardly extending arm fitting in the cut-out portion of the blade and having its face flush with the face of the blade, the said arm having a reduced extension at its forward end underlying the blade, and locking means for locking the underlying part of said arm to the said blade.

2. A shovel, spade or similar implement, comprising a blade and a handle pivotally connected with each other, the blade having an aperture spaced from the pivotal connection and the handle having a forwardly extending arm underlying the blade, the arm being provided with a lug engaging the said aperture, and means to lock the lug in place on the blade.

3. A shovel, spade or similar implement, comprising a shovel and a handle, the shovel being provided at its base with transversely extending registering eyes spaced apart, the shovel having a cut-out portion at the base between the said eyes, the said handle having a transverse aperture registering with the said eyes, the said handle having a forwardly extending angular arm, the rear portion of which fits into the said cut-out portion and the forward portion of which underlies the blade, a pintle removably held in the said eyes and passing through the aperture in the handle, and a fastening device for removably fastening the handle arm to the blade.

4. A shovel, spade or similar implement, comprising a shovel and a handle, the shovel being provided at its base with transversely extending registering eyes spaced apart, the shovel having a cut-out portion at the base between the said eyes, the said handle having a transverse aperture registering with the said eyes, the said handle having a forwardly extending angular arm, the rear portion of which fits into the said cut-out portion and the forward portion of which underlies the blade, a lug on the said forward portion of the arm extending through an aperture in the blade, a removable locking device for the said lug, and a pintle removably engaging the said eyes and extending through the aperture in the handle.

In testimony whereof I have signed my name to this specification in the presence of two subscribing witnesses.

EDWARD KINZEL.

Witnesses:
 JOHN J. MCCALL,
 WILLIAM KLEIN.

Copies of this patent may be obtained for five cents each, by addressing the "Commissioner of Patents, Washington, D. C."